United States Patent [19]

Satake et al.

[11] Patent Number: 4,960,806
[45] Date of Patent: Oct. 2, 1990

[54] STRETCHED POLY(ARYLENE THIOETHER) BLOCK COPOLYMER FILMS AND PRODUCTION PROCESS THEREOF

[75] Inventors: Yoshikatsu Satake, Iwaki; Shinji Yamamoto, Urawa; Takashi Kaneko, Tokyo; Masahito Tada, Matsudo; Ken Kashiwadate, Iwaki; Toshiya Mizuno, Tsuchiura; Hiroyuki Endo, Chiyoda; Takayuki Katto, Iwaki; Zenya Shiiki, Narashino, all of Japan

[73] Assignee: Kureha Kagaku Kagyo K.K., Tokyo, Japan

[21] Appl. No.: 424,625

[22] Filed: Oct. 20, 1989

[30] Foreign Application Priority Data

Oct. 25, 1988 [JP] Japan .................. 63-267290
Nov. 15, 1988 [JP] Japan .................. 63-286836

[51] Int. Cl.$^5$ .............. C08K 5/35; C08F 283/00; C08G 14/00
[52] U.S. Cl. .................. 524/100; 524/103; 524/106; 524/128; 524/323; 524/334; 524/396; 524/405; 524/592; 525/471; 525/537; 264/288.4; 264/290.2
[58] Field of Search ......... 525/471, 537; 524/100, 524/126, 128, 103, 323, 334, 405, 396, 592; 264/288.4, 290.2

[56] References Cited

U.S. PATENT DOCUMENTS

| | | | |
|---|---|---|---|
| 4,590,104 | 5/1986 | Zeiner et al. | 558/100 |
| 4,690,972 | 9/1987 | Johnson et al. | 524/609 |
| 4,698,415 | 10/1987 | Sinclair et al. | |
| 4,716,212 | 12/1987 | Gaughan et al. | 528/226 |
| 4,745,167 | 5/1988 | Iizuka et al. | 526/262 |
| 4,826,906 | 5/1989 | Satake et al. | 524/381 |
| 4,873,283 | 10/1989 | Satake | 524/520 |
| 4,886,871 | 12/1989 | Satake | 528/226 |
| 4,895,892 | 1/1990 | Satake | 524/520 |
| 4,895,893 | 1/1990 | Satake | 524/592 |
| 4,895,912 | 1/1990 | Satake | 525/471 |
| 4,895,924 | 1/1990 | Satake | 528/226 |
| 4,895,925 | 1/1990 | Satake | 528/226 |
| 4,897,238 | 1/1990 | Satake | 264/288.4 |

FOREIGN PATENT DOCUMENTS

| | | |
|---|---|---|
| 270955 | 6/1988 | European Pat. Off. . |
| 274754 | 7/1988 | European Pat. Off. . |
| 280325 | 8/1988 | European Pat. Off. . |
| 3405523 | 8/1985 | Fed. Rep. of Germany . |
| 13347 | 7/1972 | Japan . |
| 58435 | 4/1985 | Japan . |
| 104126 | 6/1985 | Japan . |
| 221229 | 10/1986 | Japan . |

OTHER PUBLICATIONS

*Indian J. Chem.*, vol. 21A, May 1982, pp. 501–502.
*Indian Journal of Pure and Applied Physics*, vol. 22, Apr. 1984, pp. 247–248.
*Mol. Cryst. Liq. Cryst.*, vol. 83, 1982, pp. 229–238.

Primary Examiner—Morton Foelak
Attorney, Agent, or Firm—Lowe, Price, Leblanc, Becker & Shur

[57] ABSTRACT

Disclosed herein are stretched poly(arylene thioether) block copolymer films and production processes thereof, said block copolymer film comprising a thermoplastic material composed of (A) 100 parts by weight of a particular poly(arylene thioether) block copolymer, (B) up to 100 parts by weight of at least one other thermoplastic resin, and (C) up to 15 parts by weight of at least one filler. The poly(arylene thioether) block copolymer alternately comprises at least one poly(arylene thioether-ketone) block having predominant recurring units of the formula

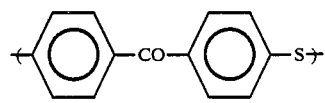

wherein the —CO— and —S— are in the para position to each other and at least one poly(arylene thioether) block having predominant recurring units of the formula

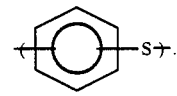

8 Claims, No Drawings

STRETCHED POLY(ARYLENE THIOETHER) BLOCK COPOLYMER FILMS AND PRODUCTION PROCESS THEREOF

FIELD OF THE INVENTION

This invention relates to stretched films using a novel poly(arylene thioether) block copolymer comprising poly(arylene thioether-ketone) blocks and poly(arylene thioether) blocks, and more specifically to stretched films which are formed solely from the block copolymer having high melt stability sufficient to permit application of conventional melt processing techniques, or a thermoplastic material composed of the block copolymer and at least one other thermoplastic resin and/or at least one filler, are less susceptible of developing gel-like substances (undissolved substances) and have excellent transparency, strength and heat-resistance; and to a production process thereof.

This invention is also concerned with stretched films using a block copolymer containing a specific stabilizer and having still improved melt stability.

BACKGROUND OF THE INVENTION

In the fields of the electronic and electrical industry and the automobile, aircraft and space industries, there is a strong demand in recent years for crystalline thermoplastic resins having high heat resistance of about 300° C. or higher in terms of melting point and moreover easy melt processability.

Recently, poly(arylene thioether-ketones) (hereinafter abbreviated as "PTKs") have drawn attention for their high melting points. Various studies are now under way thereon.

There are some disclosure on PTKs, for example, in Japanese Patent Laid-Open No. 58435/1985, German Offenlegungsschrift No. 34 05 523 A1, Japanese Patent Laid-Open No. 104126/1985, Japanese Patent Laid-Open No. 13347/1972, Indian J. Chem., 21A, 501–502 (May, 1982), Japanese Patent Laid-Open No. 221229/1986, U.S. patent specification No.4,716,212, U.S. patent specification No. 4,690,972, European Patent Publication No. 0,270,955 A2, European Patent Publication No. 0,274,754 A2, European Patent Publication No. 0,280,325 A2, etc.

Regarding the PTKs described in the above publications, neither molding nor forming has however succeeded to date in accordance with conventional melt processing techniques. Incidentally, the term "conventional melt processing techniques" as used herein means usual melt processing techniques for thermoplastic resins, such as extrusion, injection molding and melt spinning.

The unsuccessful molding or forming of PTKs by conventional melt processing techniques is believed to be attributed to the poor melt stability of the prior art PTKs, which tended to lose their crystallinity or to undergo crosslinking and/or carbonization, resulting in a rapid increase in melt viscosity, upon their melt processing.

The present inventors thus conducted an investigation with a view toward developing a process for economically producing PTKs having melt stability sufficient to permit the application of conventional melt processing techniques. The investigation led to the successful provision of PTKs having significantly improved heat stability upon melting (hereinafter called "melt stability") (Japanese Patent Laid-Open No. 54031/1989).

It has also found that the melt stability of the melt-stable PTKs upon melt processing can be improved further by the addition of a basic compound such as the hydroxide or oxide of a Group IA or Group IIA metal of the periodic table to them (Japanese Patent Application No. 142772/1988).

The melt-stable PTKs obtained as described above have a high melting point, typified by the extremely high melting point of the homopolymer which reaches as high as about 360° C. This is however not all good. Their melt processing temperatures are high accordingly, so that melt processing facilities for high-temperature processing are required. Further, a stringent temperature control is required to perform melt processing without deterioration by heat.

The melt-stable PTKS are generally obtained as fine powders having a particle size of approximately 5–20 μm. This has led to an additional problem upon their production such that they show poor handling properties in their collection step after polymerization, especially in filtration, washing, drying and transportation. Still further problems have also arisen such as poor metering property upon melt processing and occurrence of blocking in hoppers or the like.

OBJECTS AND SUMMARY OF THE INVENTION

An object of this invention is to provide stretched films which have high melt stability sufficient to permit application of conventional melt processing techniques, are less susceptible of developing gel-like substances and have excellent transparency, strength and heat resistance.

Another object of this invention is to obtain novel copolymers with improved processability and handling properties while retaining the excellent properties, such as heat resistance and crystallinity, of the aforementioned melt-stable PTKs as much as possible and then to provide stretched films having the above-described properties by using the above copolymer.

The present inventors then attempted to produce a PTK-PATE block copolymer in which a poly(arylene thioether) (hereinafter abbreviated as "PATE") having recurring units of the formula

is incorporated as blocks in the chain of a melt-stable PTK. As a result, it has been found that a poly(arylene thioether) block copolymer having excellent processability and high crystallinity can be obtained by using as a prepolymer a PATE, which has a particular average polymerization degree and contains terminal thiolate groups and/or thiol groups as reactive terminal groups, and reacting the PATE prepolymer with a 4,4'-dihalobenzophenone and an alkali metal sulfide under specific conditions in an organic aide solvent.

It has also been found that a block copolymer having excellent properties can be obtained by reacting a PATE prepolymer with a PTK prepolymer under specific conditions.

It has also been uncovered that each of these block copolymers can be obtained as granules having good handling properties from its polymerization systems by a conventional collection method.

It has also been revealed that the block copolymers have high melt stability upon melting and formed or molded products such as films can hence be obtained easily by a conventional melt processing technique from the block copolymers alone or a thermoplastic material which is a composition of the block copolymers, at least one other thermoplastic resin and/or at least one filler.

In addition, it has also been found that thermoplastic materials improved still further in melt stability and crystallinity reduction and improved in problems such as sticking of thermal decomposition products to resin residence areas of melt processing equipment can each be obtained by adding a specific basic compound, optionally along with an antioxidant, to the above-described thermoplastic material containing the block polymers.

The present invention has been brought to completion on the basis of these findings.

In one aspect of this invention, there is thus provided a stretched poly(arylene thioether) block copolymer film comprising a thermoplastic material composed of:

(A) 100 parts by weight of a poly(arylene thioether) block copolymer (Component A) alternately comprising (X) at least one poly(arylene thioetherketone) block having predominant recurring units of the formula

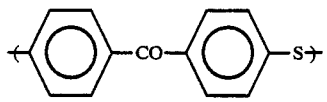

wherein the —CO— and —S— are in the para position to each other and (Y) at least one poly(arylene thioether) block having predominant recurring units of the formula

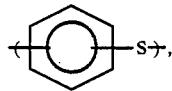

(a) the ratio of the total amount of the poly(arylene thioether) block (Y) to the total amount of the poly(arylene thioether-ketone) block (X) ranging from 0.05 to 5 by weight, (b) the average polymerization degree of the poly(arylene thioether) block (Y) being at least 10, and (c) said block copolymer having a melt viscosity of 50–100,000 poises as measured at 350° C. and a shear rate of 1,200/sec;

(B) optionally, not greater than 100 parts by weight of at least one other thermoplastic resin (Component B); and (C) optionally, not greater than 15 parts by weight of at least one filler (Component C).

In a further aspect of this invention, there is also provided a process for the production of a stretched poly(arylene thioether) block copolymer film from a thermoplastic material composed of:

(A) 100 parts by weight of a poly(arylene thioether) block copolymer (Component A) alternately comprising (X) at least one poly(arylene thioetherketone) block having predominant recurring units of the formula

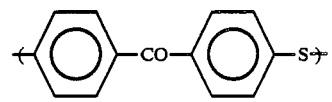

wherein the —CO— and —S— are in the para position to each other and (Y) at least one poly(arylene thioether) block having predominant recurring units of the formula

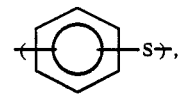

(a) the ratio of the total amount of the poly(arylene thioether) block (Y) to the total amount of the poly(arylene thioether-ketone) block (X) ranging from 0.05 to 5 by weight, (b) the average polymerization degree of the poly(arylene thioether) block (Y) being at least 10, and (c) said block copolymer having a melt viscosity of 50–100,000 poises as measured at 350° C. and a shear rate of 1,200/sec;

(B) optionally, not greater than 100 parts by weight of at least one other thermoplastic resin (Component B); and (C) optionally, not greater than 15 parts by weight of at least one filler (Component C), which comprises stretching an amorphous film made of the thermoplastic material at a draw ratio of 1.5–7 times in at least one direction within a temperature range of 90°–170° C. and then heat setting the stretched film at a temperature range of 160°–350° C.

In the stretched film of the present invention and the production process thereof, the thermoplastic material may further comprises, per 100 parts by weight of the poly(arylene thioether) block copolymer (Component A), 0.1–10 parts by weight of at least one basic compound (Component D) selected from the group consisting of hydroxides, oxides and aromatic carboxylates of group IIA metals of the periodic table other than magnesium, and aromatic carboxylates, carbonates, hydroxides, phosphates, including condensation products, and orates, including condensation products, of group IA metals of the periodic table and 0–10 parts by weight of at least one antioxidant (Component E) selected from the group consisting of hindered phenolic compounds, phosphorus compounds and hindered amine compounds. Use of this thermoplastic material permits the provision of the stretched films improved still further in melt stability.

According to this invention, a stretched film having high heat resistance, being less susceptible of developing gel-like substances and having excellent transparency, strength and melt stability can easily be obtained by a conventional melt processing technique from a thermoplastic material comprising a high-crystalline poly(arylene thioether) block copolymer, which has high melt stability sufficient to permit application of the conventional melt processing technique, tends to develop less gel-like substances and has good processability and handling properties, or if desired, the thermoplastic material may comprise a composition of the block copolymer, at least one other thermoplastic resin and/or at least one filler.

This invention can also provide stretched film having excellent physical properties while improving problems such as the melt viscosity increase, the crystallinity reduction and the sticking of thermal decomposition products to resin residence areas of melt processing equipment upon conventional melt processing by using the thermoplastic material with the basic compound or the like added further.

The present invention will hereinafter be described in detail.

DETAILED DESCRIPTION OF THE INVENTION

[Component A]

{Poly(Arylene Thioether) Block Copolymers}

[Chemical structure of block copolymers]

The poly(arylene thioether) block copolymer useful in the practice of the present invention is a block copolymer alternately comprising (X) at least one PTK block having predominant recurring units of the formula

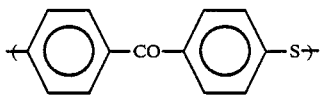

wherein the —CO— and —S— are in the para position to each other and (Y) at least one PATE block having predominant recurring units of the formula

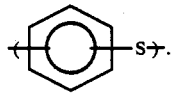

The block copolymer of the present invention can have a desired structure containing both blocks in an alternate order, such as $(X)\text{-}[(Y)-(X)]_m(Y)\text{-}(X)$, m being 0 or an integer of 1 or greater or $(X)\text{-}[(Y)-(X)]_n(Y)$, n being 0 or an integer of 1 or greater.

It is however required that the weight ratio of the total amount of blocks (Y) to the total amount of blocks (X) be within a range of 0.05–5, preferably 0.1–4, more preferably 0.15–3.

The block (X) serves to impart high degrees of heat resistance and crystallinity to the block copolymer. On the other hand, the block (Y) contributes to the reduction of the processing temperature and the granulation while maintaining the high crystallinity. Therefore, any weight ratios of the total amount of blocks (Y) to the total amount of blocks (X) smaller than 0.05 are too small to achieve any sufficient reduction in processing temperature or the granulation. To the contrary, any ratios greater than 5 lead to a substantial reduction in heat resistance and disturb the balancing between heat resistance and processability. Ratios outside the above range are therefore not preferred.

It is essential for the block (Y) to have an average polymerization degree of at least 10, preferably 20 or higher.

If the average polymerization degree of the block (Y) is smaller than 10, the resulting block copolymer becomes similar to a random copolymer so that physical properties such as crystallinity, heat resistance and melt stability are all reduced substantially. Such small average polymerization degrees are therefore not preferred. In addition, any unduly small average polymerization degree of the block (Y) leads to another problem that a block copolymer of high molecular weight can hardly be obtained.

The block (X) and block (Y) can contain one or more recurring units other than their predominant recurring units of the formulae

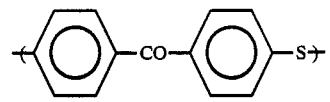

and

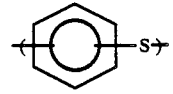

to an extent that the objects of this invention are not impaired.

Exemplary recurring units other than the above recurring units may include:

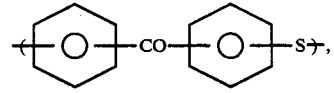

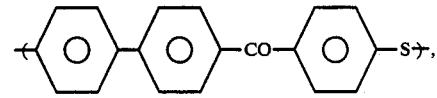

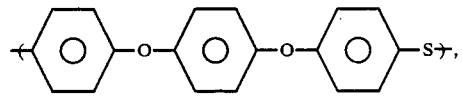

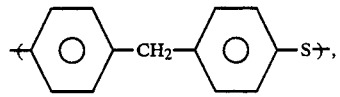

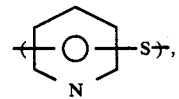

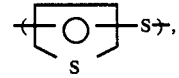

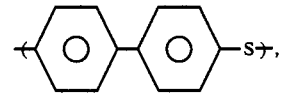

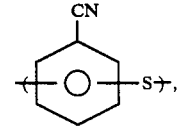

-continued

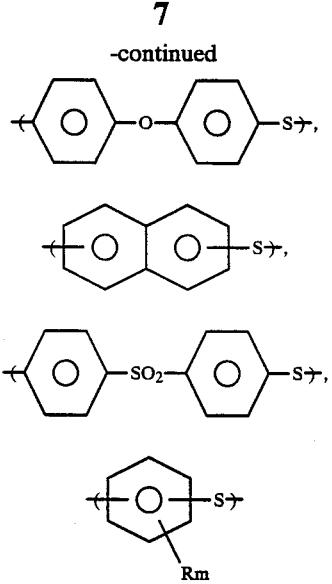

(wherein R means an alkyl group having 5 or less carbon atoms and m stands for an integer of 0-4.).

In general, these other recurring units can be introduced into the block copolymer by using the corresponding various dihalogenated aromatic compounds as comonomers.

[Physical properties of the block copolymer]

Physical properties and other characteristics of the poly(arylene thioether) block copolymer useful in the practice of this invention will next be described in detail from the viewpoint of processability, melt stability, crystallinity and the like.

(1) Processability:

The melting point of PTK homopolymer is about 360° C. The extent of a reduction in the melting point due to copolymerization with another monomer of a different kind, $\Delta Tm=[360°\ C.-Tm$ (melting point of copolymer)] is generally proportional to the extent of a reduction in the melt processing temperature. Accordingly, $\Delta Tm$ can be used as an index indicative of processing temperature reducing effect, namely, processability improving effect.

$\Delta Tm$ may preferably be 10°–80° C., more preferably 20°–70° C., most preferably 30°–60° C. If $\Delta Tm$ is lower than 10° C., there is a potential problem that the processability improving effect may not be sufficient. If $\Delta Tm$ is higher than 80° C., there is another potential problem that the block copolymer may lose the characteristics as a heat-resistant resin. $\Delta Tm$ outside the above range is therefore not preferred.

(2) Crystallinity:

One of great features of the block copolymers according to this invention resides in that they have not only excellent processability but also high crystallinity. Crystallinity imparts high heat resistance to a copolymer. To have a block copolymer equipped with high heat resistance, it is essential that the block copolymer has sufficient crystallinity.

In general, melt crystallization enthalpy $\Delta Hmc$ is proportional to the degree of crystallization when a molten polymer undergoes crystallization. On the other hand, melt crystallization temperature Tmc serves as an index of the readiness of crystallization. Therefore, the melt crystallization enthalpy $\Delta Hmc$ (400° C.) and melt crystallization temperature Tmc (400° C.) of a block copolymer according to this invention as measured when cooled at a rate of 10° C./min immediately after being heated to 400° C. in an inert gas atmosphere by means of a differential scanning calorimeter (hereinafter abbreviated as "DSC") can be used as indices of the crystallinity of the block copolymer.

In addition, residual melt crystallization enthalphy, $\Delta Hmc$ (400° C./10 min) and melt crystallization temperature, Tmc (400° C./10 min) measurable upon determination of the residual crystallinity, both of which will be described subsequently, can be used as an index of not only melt stability but also crystallinity.

The block copolymers of this invention may have a melt crystallization enthalpy, $\Delta Hmc$ (400° C.) of at least 15 J/g, preferably at least 20 J/g, and more preferably at least 25 J/g. On the other hand, Tmc (400° C.) may desirably be at least 180° C., with at least 200° C. being more preferred. Block copolymers having $\Delta Hmc$ (400° C.) smaller than 15 J/g or Tmc (400° C.) lower than 180° C. may have insufficient heat resistance as heat resistant polymers and are hence not preferred.

(3) Melt stability:

The greatest feature of the block copolymers according to this invention resides in that they have melt stability sufficient to permit the application of conventional melt processing techniques.

Polymers of poor melt stability tend to lose their crystallinity or to undergo crosslinking or carbonization, resulting in a rapid increase in melt viscosity, upon melt processing.

It is hence possible to obtain an index of the melt processability of a polymer by investigating the residual crystallinity of the polymer after holding it at an elevated temperature of its melt processing temperature or higher for a predetermined period of time. The residual crystallinity can be evaluated quantitatively by measuring the melt crystallization enthalpy of the polymer by a DSC.

Specifically described, it is possible to use as indices of the melt stability of a block copolymer its residual melt crystallization enthalphy, $\Delta Hmc$ (400° C./10 min) and melt crystallization temperature, Tmc (400° C./10 min), which are determined at a cooling rate of 10° C./min after the block copolymer is held at 50° C. for 5 minutes in an inert gas atmosphere, heated to 400° C. at a rate of 75° C./ min and then held for 10 minutes at 400° C. which is higher than the melt processing temperature of the block copolymer.

In the case of a copolymer having poor melt stability, it undergoes crosslinking or the like under the above conditions, namely, when it is held for 10 minutes at the high temperature of 400° C., where by the copolymer loses its crystallinity substantially.

The block copolymers of this invention are polymers having the physical properties that their residual melt crystallization enthalpies, $\Delta Hmc$ (400° C./10 min) are at least 10 J/g, more preferably at least 15 J/g, most preferably at least 20 J/g and their melt crystallization temperatures, Tmc (400° C./10 min) are at least 170° C., more preferably at least 180° C., most preferably at least 190° C.

A block copolymer, whose $\Delta Hmc$ (400° C./10 min) is smaller than 10 J/g or whose Tmc (400° C./10 min) is lower than 170° C., tends to lose its crystallinity or to induce a melt viscosity increase upon melt processing, so that difficulties are encountered upon application of conventional melt processing techniques.

Further, the ratio of melt crystallization enthalpy to residual melt crystallization enthalpy, namely, $\Delta Hmc$ (400° C.)/$\Delta Hmc$ (400° C./10 min) can also be used as an index of melt stability. Deterioration by heat becomes smaller as this ratio decreases. Therefore, it is preferable that $\Delta Hmc$ (400° C./10 min) is at least 10 J/g and the above ratio is 5 or smaller, more preferably 3 or smaller.

(4) Melt viscosity:

In this invention, the melt viscosity $\eta^*$ of each copolymer is used as an index of its molecular weight.

Specifically, a polymer sample is filled in a Capirograph manufactured by Toyo Seiki Seisaku-Sho, Ltd. and equipped with a nozzle having an inner diameter of 1 mm and an L/D ratio of 10/1 and is preheated at 350° C. for 5 minutes. Its melt viscosity $\eta^*$ is measured at a shear rate of 1,200/sec.

The block copolymers of the present invention have a melt viscosity $\eta^*$ of 50–100,000 poises, preferably 100–10,000 poises, more preferably 150–5,000 poises.

Those having a melt viscosity $\eta^*$ lower than 50 poises have an unduly small molecular weight so that their flowability is too high to form films by conventional melt processing techniques. Even if films are obtained, their physical properties are considerably inferior. Such low melt viscosities are therefore not preferred. On the other hand, those having a melt viscosity $\eta^*$ higher than 100,000 poises have an unduly large molecular weight so that their flowability is too low to apply conventional melt processing techniques. Such high melt viscosities are therefore not preferred either.

Production Process of Block Copolymers

Processes for the production of the block copolymers include:

(1) addition of a dihalogenated aromatic compound consisting principally of a 4,4'-dihalobenzophenone and an alkali metal sulfide to PATE blocks (Y) prepared in advance, whereby they are reacted to form PTK blocks (X); and (2) chemical coupling of PTK blocks (X) and PATE blocks (Y), said blocks (X) and (Y) having been prepared separately.

A. Raw materials for block copolymers:

In the process for the production of a block copolymer of this invention, are primarily employed an alkali metal sulfide and a dihalogenated aromatic compound as principal raw materials for the polymer as well as an organic amide solvent and water, including water of hydration, as reaction polymerization media.

(1) Alkali metal sulfide:

Illustrative examples of the alkali metal sulfide useful in the practice of this invention include lithium sulfide, sodium sulfide, potassium sulfide, rubidium sulfide, cesium sulfide and mixtures thereof.

These alkali metal sulfides may each be used as a hydrate or aqueous mixture or in an anhydrous form.

(2) Dihalogenated aromatic compound:

The dihalogenated aromatic compound employed in the present invention for the formation of the PTK block (X), including a PTK prepolymer, consists principally of one or more dihalobenzophenones, i.e., 4,4'-dichlorobenzophenone and/or 4,4'-dibromobenzophenone.

The dihalogenated aromatic compound used for the formation of the PATE block (Y), including a PATE prepolymer, consists principally of a dihalobenzene such as p-dichlorobenzene or m-dichlorobenzene.

As other copolymerizable dihalogenated aromatic compounds, may be mentioned, for example, dihalobenzophenones other than the 4,4'-isomers, dihaloalkylbenzenes, dihalobiphenyls, dihalodiphenyl sulfones, dihalonaphthalenes, bis(halogenated phenyl)methanes, dihalopyridines, dihalothiophenes and dihalobenzonitriles, and mixtures thereof.

It is also permissible to introduce a partially cross-linked and/or branched structure by causing a trihalogenated or higher polyhalogenated compound to exist in a reaction system in such a small amount that the processability and physical properties of the copolymer may not be impaired to any substantial extent.

(3) Organic amide solvent:

As organic amide solvents useful for the present invention, may be mentioned N-methylpyrrolidone, N-ethylpyrrolidone, hexamethylphosphoric triamide, tetramethylurea, dimethylimidazolidinone, dimethylacetamide, a mixed solvent thereof, etc.

B. Polymerization process and reaction conditions:

To prepare the PATE prepolymer in this invention, any process conventionally known for the polymerization of PATE can be adopted. However, for the reaction in which the PTK is formed in the presence of the PATE prepolymer, for the preparation of the PTK prepolymer and for the reaction in which the PTK prepolymer and PATE prepolymer are combined together to form a block copolymer, it is necessary to conduct the reactions under special conditions, namely, by maintaining a high water content in the reaction systems, controlling the monomer compositions suitably, regulating the polymerization temperatures appropriately, and limiting reaction time at high temperatures. It is effective for the production of block copolymers having more preferable physical properties, for example, to choose a suitable material for the reactor and to apply stabilization treatment in a final stage of the reaction.

Unless these reaction conditions are suitably controlled, it is difficult to provide block copolymers having melt stability suitable for conventional melt processing.

<Preparation processes of prepolymers>

(1) PATE prepolymer:

The PATE prepolymer employed as a raw material for the block copolymer of this invention can be prepared by having an alkali metal sulfide and a dihalogenated aromatic compound, which consists principally of a dihalobenzene, undergo a dehalogenation/sulfuration reaction in the presence of water in an organic amide solvent under the following conditions (a)–(c):

(a) The ratio of the water content to the amount of the charged organic amide solvent is within a range of 0.2–5 (mol/kg), preferably 0.5–4.5 (mol/kg).

(b) The ratio of the amount of the charged dihalogenated aromatic compound to the amount of the charged alkali metal sulfide is within a range of 0.8–1.05 (mol/mol), preferably 0.8–1.0 (mol/mol), more preferably 0.85–0.95 (mol/mol).

(c) The reaction is conducted at a temperature within a range of 200°–280° C., preferably 210°–250° C., and should be continued until the average polymerization degree of the resulting prepolymer reaches at least 10, preferably 20 or greater.

When the ratio of the amount of the charged dihalogenated aromatic compound to the amount of the charged alkali metal sulfide is set at 0.95 or greater (mol/mol), notably, 1.0 or greater (mol/mol) as the above condition (b), the reaction product may be treated further with the alkali metal sulfide to prepare a PATE prepolymer containing more thiolate groups as reactive terminal groups. The PATE prepolymer may contain some crosslinked structure and/or branched structure introduced typically by allowing a trihalobenzene or higher polyhalobenzene to present in a small amount in the polymerization reaction system.

The PATE prepolymer is supposed to be a polymer having an average polymerization degree of at least 10, preferably at least 20 in view of the physical properties required for the block copolymer to be obtained.

In this invention, the number average molecular weight of the PATE block in the stage of the prepolymer is determined by applying the method which relies upon the numbers of terminal thiol groups, thiolate groups and terminal halogen atoms.

Incidentally, it is preferred from the standpoint of reactivity that the ratio of terminal thiolates, including thiol groups if any, to terminal halogen atoms in the PATE prepolymer chain is at least 0.3 (mol/mol), more preferably at least 0.5 (mol/mol). If this ratio is smaller than 0.3, the reactivity at the terminals of the PATE prepolymer is insufficient thereby to make it difficult to obtain a block copolymer.

In passing, among the recurring units of the formula

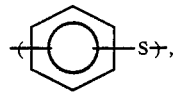

the paraphenylene sulfide unit of the formula

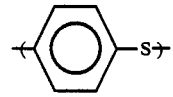

is preferred because it can afford block copolymers excellent especially from the viewpoint of crystallinity, melt stability, heat resistance, mechanical properties and the like.

(2) PTK prepolymer:

The PTK prepolymer employed as a raw material for the block copolymer of this invention can be prepared in the following manner.

Namely, the PTK prepolymer can be prepared by having an alkali metal sulfide and a dihalogenated aromatic compound, which consists principally of 4,4′-dichlorobenzophenone and/or 4,4′-dibromobenzophenone, undergo a dehalogenation/sulfuration reaction in the presence of water in an organic amide solvent under the following conditions (a)-(b):

(a) The ratio of the water content to the amount of the charged organic amide solvent is within a range of 2.5-15 (mol/kg).

(b) The reaction is conducted at a temperature within a range of 60°-300° C. with the proviso that the reaction time at 210° C. and higher is not longer than 10 hours.

The PTK prepolymer may contain some crosslinked structure and/or branched structure introduced typically by allowing a trihalobenzophenone or higher polyhalobenzophenone to present in a small amount in the polymerization reaction system.

<Production process of block copolymers (Process No. 1)>

As a production process for each block copolymer according to this invention, may be described the process in which a PATE prepolymer is prepared in advance and at least one PTK block is formed in the presence of the PATE prepolymer.

Practically, this process is the following two-step process:

A process for the production of a poly(arylene thioether) block copolymer comprising (X) at least one PTK block and (Y) at least one PATE block, which comprises at least the following two steps:

(i) heating in the presence of water an organic amide solvent containing a dihalogenated aromatic compound, which consists principally of a dihalobenzene, and an alkali metal sulfide, whereby a reaction mixture containing a poly(arylene thioether) prepolymer having predominant recurring units of the formula

and reactive terminal groups is formed, and (ii) mixing the reaction mixture, which has been obtained in the step (i), with a dihalogenated aromatic compound consisting principally of at least one dihalobenzophenone selected from 4,4′-dichlorobenzophenone and 4,4′-dibromobenzophenone, an alkali metal sulfide, an organic amide solvent and water and heating the resultant mixture to form a PTK block having predominant recurring units of the formula

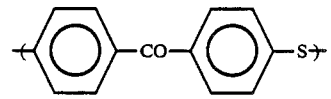

wherein the —CO— and —S— are in the para position to each other, said first and second steps (i) and (ii) being conducted under the following conditions (a)-(f):

(a) in the first step i), the ratio of the water content to the amount of the charged organic amide solvent being 0.2-5 (mol/kg), the ratio of the amount of the charged dihalogenated aromatic compound to the amount of the charged alkali metal sulfide being 0.8-1.05 (mol/mol), and the polymerization being conducted until the average polymerization degree of the poly(arylene thioether) prepolymer becomes at least 10, (b) in the second step, the ratio of the water content to the amount of the charged organic amide solvent being controlled within a range of 2.5-15 (mol/kg), (c) in the second step, the ratio of the total amount of the charged dihalogenated aromatic compound, said total amount being the amount of the whole dihalogenated aromatic compounds including the dihalobenzene and the dihalobenzophenone to the total amount of the charged alkali metal sulfide, said latter total amount being the total amount of the alkali metal sulfide charged in the first step (i) and that charged in the second step (ii), being controlled within a range of 0.95-1.2 (mol/mol), (d) the ratio of the charged amount of the dihalogenated aromatic compound consisting principally of the dihalobenzophenone to the charged amount of the dihalogenated aromatic compound consisting principally of the dihalobenzene being controlled within a range of 0.1–10 (mol/mol), (e) the reaction of the second step (ii) being conducted within a temperature range of 150°–300° C. with the proviso that the reaction time at 210° C. and higher is not longer than 10 hours, and (f) in the second step (ii), the reaction is conducted until the melt viscosity of the resulting block copolymer becomes 50–100,000 poises as measured at 350° C. and a shear rate of 1,200/sec.

<Production process of block copolymers (Process No. 2)>

As another production process for each block copolymer according to this invention, may be described the process in which PATE prepolymer and PTK prepolymers are prepared in advance and are then reacted to combine them together. This process is practically the following 3-step process:

A process for the production of a poly(arylene thioether) block copolymer comprising (X) at least one PTK block and (Y) at least one PATE block, which comprises at least the following three steps:

(i) heating in the presence of water an organic amide solvent containing a dihalogenated aromatic compound, which consists principally of a dihalobenzene, and an alkali metal sulfide, whereby a first reaction mixture containing a PATE prepolymer having predominant recurring units of the formula

and reactive terminal groups is formed, (ii) heating in the presence of water an organic amide solvent containing a dihalogenated aromatic compound, which consists principally of at least one dihalobenzophenone selected from 4,4'-dichlorobenzophenone and 4,4'-dibromobenzophenone, an alkali metal sulfide, whereby a second reaction mixture containing a PTK prepolymer having predominant recurring units of the formula

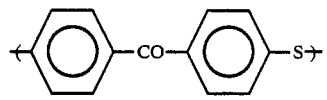

wherein the —CO— and —S— are in the para position to each other and reactive terminal groups is formed, and (iii) mixing and reacting the first reaction mixture, which has been obtained in the first step (i) and contains the PATE prepolymer, with the second reaction mixture obtained in the second step (ii) and containing the PTK prepolymer;

said first through third steps (i)–(iii) being conducted under the following conditions (a)–(g):

(a) in the first step i), the ratio of the water content to the amount of the charged organic amide solvent being 0.2–5 (mol/kg), the ratio of the amount of the charged dihalogenated aromatic compound to the amount of the charged alkali metal sulfide being 0.8–1.05 (mol/mol), and the polymerization being conducted until the average polymerization degree of the PATE prepolymer becomes at least 10, (b) in the second step, the ratio of the water content to the amount of the charged organic amide solvent being controlled within a range of 2.5–15 (mol/kg) and the reaction being conducted within a temperature range of 60°–300° C. with the proviso that the reaction time at 210° C. and higher is not longer than 10 hours, (c) in the third step, the ratio of the water content to the amout of the charged organic amide solvent being controlled within a range of 2.5–15 (mol/kg), (d) in the third step, the ratio of the total amount of the charged dihalogenated aromatic compound, said total amount being the amount of the whole dihalogenated aromatic compounds including the dihalobenzene and the dihalobenzophenone to the total amount of the charged alkali metal sulfide, said latter total amount being the total amount of the alkali metal sulfide charged in the first step (i) and that charged in the second step (ii), being controlled within a range of 0.95–1.2 (mol/mol), (e) the ratio of the whole poly(arylene thioether) prepolymer to the whole poly(arylene thioether-ketone) prepolymer being controlled at 0.05–5 by weight, (f) the reaction of the third step (iii) being conducted within a temperature range of 150°–300° C. with the proviso that the reaction time at 210° C. and higher is not longer than 10 hours, and (g) in the third step (iii), the reaction is conducted until the melt viscosity of the resulting block copolymer becomes 50–100,000 poises as measured at 350° C. and a shear rate of 1,200/sec.

In the process for the production of each of the PTK prepolymer and the block copolymer, it is preferable to use, as a reactor (including equipment employed for provisional procedures of the polymerization reaction, for example, those required for dehydration and the like), a reactor made of a corrosion-resistant material at least at portions with which the reaction mixture is brought into direct contact. The corrosion-resistant material is supposed to be inert so that it does not react with the reaction mixture. Preferred examples of the corrosion-resistant material include titanium materials such as titanium and titanium-containing alloys.

Further, in a final stage of the reaction, at least one halogen-substituted aromatic compound having at least one substituent group having electron-withdrawing property at least equal to —CO— group (preferably, 4,4'-dichlorobenzophenone and/or 4,4'-dibormobenzophenone employed as a monomer) may be added to the reaction system to react it to the above-obtained block copolymer, whereby a block copolymer improved further in melt stability can be obtained. Here, it should be noted that the term "final stage of the reaction" as used herein means a period after the lapse of about one third of the overall period of the reaction from the initiation thereof. Further, the amount of the halogen-substituted aromatic compound charged in the final stage of the reaction is not included in the above-described amount of the charged dihalogenated aromatic compound.

Thermoplastic Materials

The thermoplastic material usable in the present invention is obtained by blending the poly(arylene thioether) block copolymer (Component A) optionally with at least one other thermoplastic resin (Component B) and/or at least one filler (Component C) in order to modify and/or improve various physical properties of the block copolymer, such as mechanical properties, electrical properties, thermal properties and chemical properties, to modify and/or improve its processability and to reduce the production cost of the stretched film. In addition, the composition may also be added with a basic compound (Component D) which is a melt stabilizer for Component A, optionally along with an antioxidant (Component E).

Other components of the thermoplastic material usable in the present invention will hereinafter be described specifically.

[Component B . . . Thermoplastic Resin]

Each thermoplastic material usable in the present invention may contain as Component B at least one thermoplastic resin in a proportion of 0–100 parts by weight, preferably 0–90 parts by weight, more preferably 0–80 parts by weight, per 100 parts by weight of Component A. If the proportion of Component B exceeds 100 parts by weight, the easy processability of the block copolymer will be impaired so that the stretched film will become insufficient in the prevention of development of gel-like substances, strength and heat resistance, As exemplary thermoplastic resins useful as Component B in the present invention, may be mentioned resins such as poly(arylene thioethers), poly(arylene thioether-ketones), aromatic polyether ketones, e.g., PEEKs and PEKs, polyamides (including Aramids), polyamideimides, polyesters (including aromatic polyesters and liquid crystalline polyesters), aromatic polysulfones, e.g., polysulfones and polyether sulfones, polyether imides, polyarylenes, poly(phenylene ethers), polycarbonates, polyester carbonates, polyacetals, fluoropolymers such as polytetrafluoroethylene, polyolefins, polystyrenes, polymethyl methacrylates, and ABS; as well as elastomers such as fluororubbers, silicone rubbers, olefin rubbers, acrylic rubbers, polyisobutylenes (including butyl rubber), hydrogenated SBR, polyamide elastomers and polyester elastomers. These thermoplastic resins may be used either singly or in combination.

Of the above thermoplastic resins, poly(arylene thioethers), particularly poly(arylene thioethers) containing predominant recurring units of the formula

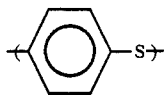

(in a proportion of at least 50 wt. %), poly(arylene thioether-ketones) containing predominant recurring units of the formula

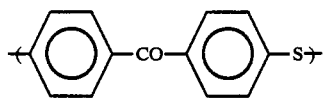

wherein the —CO— and —S— are in the para position to each other, and mixtures thereof show excellent compatibility when blended with the block copolymer of this invention, judging from the glass transition temperature of the blends as measured by a DSC, their crystallization temperatures $T_{c1}$ from a glass state, their crystallization temperature $T_{c2}$ from a molten state and the peak behaviours of the melting points of their crystals. These compositions have also been found to have the marked feature that they can provide transparent moldings under amorphous conditions when they are free of any filler.

[Component C . . . Filler]

Each thermoplastic material usable in the present invention may contain as Component C at least one filler in a proportion of up to 15 parts by weight per 100 parts by weight of Component A. If the proportion of Component C exceeds 15 parts by weight, there is a potential problem that the processability may be reduced. Such a large proportion is therefore not preferred.

As exemplary fillers useful as Component C in the invention, may be mentioned fibrous fillers such as glass fibers, carbon fibers, graphite fibers, silica fibers, alumina fibers, zirconia fibers, silicon carbide fibers and Aramid fibers as well as whiskers and the like including potassium titanate whiskers, calcium silicate (including wollastonite) whiskers, calcium sulfate whiskers, carbon whiskers, silicon nitride whiskers and boron whiskers; and also inorganic fillers such as talc, mica, kaolin, clay, silica, alumina, silica-alumina, titanium oxide, iron oxides, chromium oxide, calcium carbonate, calcium silicate, calcium phosphate, calcium sulfate, magnesium carbonate, magnesium phosphate, silicon, carbon (including carbon black), graphite, silicon nitride, molybdenum disulfide, glass, hydrotalcite, ferrite, samarium-cobalt, neodium-iron-boron, etc., all in a powder form.

These fillers may be used either singly or in combination.

[Component D . . . Basic Compound]

Addition of a specific basic compound to the thermoplastic material in the present invention can reduce or prevent the melt viscosity increase or crystallinity reduction due to thermal modification and/or thermal deterioration, the sticking of thermal decomposition products at resin residence areas of melt processing equipment, etc. upon melt processing. In addition, these stabilizing effects will be enhanced further by combined use of the basic compound with a specific antioxidant.

As basic compounds, non-oxidative, heat-resistant and low volatile compounds, more specifically, the hydroxides, oxides and aromatic carboxylates of Group IIA metals of the periodic table other than magnesium, and aromatic carboxylats, carbonates, hydroxides, phosphates (including condensation products) and borates (including condensation products) of Group IA metals of the periodic table may be mentioned.

Among these basic compounds, the hydroxides and oxides of calcium and barium, as well as the lithium, sodium and potassium salts of aromatic carboxylic acids such as naphthalene monocarboxylic acid and polycarboxylic acids, arylbenzoic acids, benzene monocarboxylic acid and polycarboxylic acids and hydroxybenzoic acids are preferred. Among the above-exemplified basic compounds, the hydroxides of calcium and barium are particularly preferred.

The proportion of the basic compound in the thermoplastic material of this invention is 0.1–10 parts by weight, preferably 0.2–5 parts by weight, more preferably 0.3–2 parts by weight, all, per 100 parts by weight of the poly(arylene thioether) block copolymer. If the proportion of the basic compound is smaller than 0.1 part by weight, its stabilizing effects cannot be exhibited to any sufficient degree. On the other hand, any proportions greater than 10 parts by weight involve a potential problem that the block copolymer may be decomposed or electrical properties and the like may be deteriorated.

[Component E ... Antioxidant]

As antioxidants used in combination with the basic compound, radical chain terminators and peroxide decomposers, more specifically, hindered phenolic compounds, phosphorus compounds and hindered amine compounds may be mentioned.

As exemplary hindered phenolic compounds, may typically be mentioned 1,3,5-trimethyl-2,4,6-tris-(3,5-di-t-butyl-4-hydroxybenzyl)benzene and compounds analogous thereto as well as octadecyl-3-(3,5-di-t-butyl-4-hydroxyphenyl)propionate, pentaerythrityltetrakis[3-(3,5-di-t-butyl-4-hydroxyphenyl)propionate] and 2,2-thio-diethylenebis[3-(3,5-di-t-butyl-4-hydroxyphenyl)-propionate].

As phosphorus compounds, those containing a trivalent phosphorus atom are preferred.

As typical examples of such trivalent phosphorus compounds, tris(2,4-di-t-butylphenyl)phosphite, bis-(2,6-di-t-butyl-4-methylphenyl)pentaerythritol diphosphite, distearylpentaerythritol diphosphite and tetrakis(2,4-di-t-butylphenyl) 4,4'-biphenylenediphosphinate may be mentioned.

As typical exemplary hindered amine compounds, poly([6-(1,1,3,3-tetramethylbutyl)imino-1,3,5-triazin-2,4-diyl][(2,2,6,6-tetramethyl-4-piperidyl)imino]hexamethylene [(2,2,6,6-tetramethyl-4-piperydyl)iminol]) and compounds analogous thereto may be mentioned.

As antioxidants, low-volatile and decomposition-resistant ones, particularly, the above-described phosphorus compounds are preferred. These antioxidants may be used either singly or in combination. When used in combination, the combination of a radical chain terminator and a peroxide decomposer is preferred.

The proportion of the antioxidant in the composition of this invention is 0–10 parts by weight, preferably 0.01–5 parts by weight, more preferably 0.1–2 parts by weight, per 100 parts by weight of the poly(arylene thioether) block copolymer. If the proportion of the antioxidant is smaller than 0.01 part by weight, it cannot exhibit a sufficient stabilizing effect. On the contrary, any proportions greater than 10 parts by weight involve a potential problem that more gas components may be evolved and/or electrical properties and the like may be deteriorated.

[Optional Components]

Each thermoplastic material usable in the present invention may optionally contain, as needed, additives such as light stabilizers, rust inhibitors, lubricants, surface-roughening agents, nucleating agents, mold releasing agents, colorants, coupling agents, flashing preventives and/or antistatic agents.

Zinc compounds such as zinc oxide and zinc carbonate are particularly preferred as scavengers for corrosive gas.

Blending Method

Thermoplastic materials usable in the present invention can each be prepared by one of various conventional blending methods including the blending of the individual components by a dry blending method.

Although all the components of the thermoplastic material including optional components may be added simultaneously, they can also be blended in an arbitrary order. For instance, after Component A and Component D are blended in advance, the mixture thus-obtained is added with the other components.

Component A and Component D are blended in advance by a dry-blending method in which Component D in the form of a dry powder is added to Component A, or by a wet method in which Component D in a wet form such as a solution or a slurry is added to Component A and the solvent is then removed to dry the resultant mixture. These mixtures can be separately molten and kneaded further, as needed, to provide molten and kneaded mixtures. In this case, Component E may also be used jointly as desired.

When Component D is blended after addition of Component B and/or Component C to Component A, their blending may be carried out in the same manner as the above-described blending method for Component D.

Dry blending method is preferred from the viewpoint that no drying step be required.

Process for the production of stretched films

The stretched film of the present invention can be produced by melt forming the poly(arylene thioether) block copolymer alone or the thermoplastic material into a film by a conventional T-die method (extrusion using a T-die), inflation (extrusion using a ring die), hot pressing or the like, stretching the film and then heat setting the same. The thermoplastic material is a composition which is composed of 100 parts by weight of the poly(arylene thioether) block copolymer and optionally up to 100 parts by weight of at least one other thermoplastic resin and/or up to 15 parts by weight of at least one filler.

Specifically described, a substantially amorphous film is obtained, for example, by feeding the above described thermoplastic material to an extruder equipped with a T-die or ring die in the surrounding atmosphere or in an inert gas atmosphere, melt-forming the material into a film at 300°–380° C. and then quenching the film or by pressing the material into a film while heating and melting it at 300°–380° C. on a hot press and then quenching the film. Incidentally, the term "substantially amorphous film" as used herein means a film which can be stretched in a temperature range around its glass transition temperature. In such a film, the ratio ($\Delta STc/\Delta STm$) of the area ($\Delta STc$) of an exothermic peak occurred upon crystallization to the area ($\Delta STm$) of an endothermic peak appeared upon melting of crystals when heated at a rate of 10° C./min from room temperature by a DSC should be 0.1 or greater.

If the amorphous film is obtained from the thermoplastic material composed of the poly(arylene thioether) block copolymer and at least one other thermoplastic resin so that plural endothermic peaks and plural exothermic peaks appear upon melting of crystals and upon crystallization respectively, it is possible to use values obtained respectively by adding areas corresponding to the respective heat quantities.

Incidentally, when an extruder such as a T-die extruder is used, the extruder may preferably be made of a corrosion resistant metal at areas where a molten resin is brought into contact with the extruder. Preferably, the extruder is vented.

The amorphous film thus obtained is next stretched by a stretching machine such as rolls, a tenter or the like in a temperature range of 90°–170° C. and at a draw ratio of 1.5–7 times in one direction (along a single axis) or in two directions, one being a desired direction and the other being perpendicular to said desired direction (along two axes) at a draw ratio of 1.5–7 times respectively. When the film is stretched along the two axes, either sequential biaxial stretching or simultaneous biaxial stretching can be used.

When uniaxial stretching is performed, a film is stretched in one direction in a temperature range of 90°-170° C., preferably 110°-160° C., at a draw ratio of 1.5-7 times, preferably 2-6 times so that the birefringence of the film may become at least equal to 0.05 but not greater than 0.4. After the stretching, it is heat-set at a temperature of 160-350° C.

If the stretching temperature is lower than 90° C., it is difficult to perform the stretching and the film tends to undergo considerable tearing, while at stretching temperatures higher than 170° C., the film become brittle by crystallization and again tends to undergo severe tearing. Judging from the degree of orientation, the tearing of the film, etc. the preferred draw ratio falls within a range of 1.5-7 times.

When sequential biaxial stretching is performed, the first-stage stretching is performed, like the uniaxial stretching, within a temperature range of 90°-170° C., preferably 110°-160° C., at a draw ratio of 1.5-7 times, preferably 2-5 times so that the birefringence of the film may become at least equal to 0.05 but not higher than 0.3. It is then subjected to the second-stage stretching within a temperature range of 90°-170° C., preferably 110°-160° C. and at a draw ratio of 1.5-7 times, preferably 2-6 times in a direction perpendicular to the direction of the first stage stretching and after that, it is heat-set at a temperature of 160°-350° C. If the second-stage stretching temperature is lower than 90° C., it is difficult to perform the stretching and the film tends to undergo considerable tearing, while at temperatures higher than 170° C., the film become brittle by crystallization and again tends to undergo severe tearing. Judging from the degree of orientation, the tearing of the film, etc. the preferred draw ratio of the second-stage stretching falls within a range of 1.5-7 times.

When simultaneous biaxial stretching is performed, the film is stretched within a temperature range of 90°-170° C., preferably 110°-160° C. and at a draw ratio of 1.5-7 times, preferably 2-6 times in each of the machine and transverse directions. In this case, the birefringence of the film may fall within a range of 0-0.35. After the stretching, it is heat-set at a temperature of 160°-350° C. Stretching temperatures lower than 90° C. are not preferable, because they are so low that the film tends to undergo tearing or whitening. If the stretching temperature is higher than 170° C., the film can hardly be stretched and moreover become prone to tearing owing to crystallization which takes place before or during the stretching. If the draw ratio is lower than 1.5 times, on the other hand, it is only possible to provide films insufficient in mechanical characteristics such as strength and modulus of elasticity. When stretched at a draw ratio higher than 7 times, the film tends to undergo severe whitening and/or tearing.

The film is heat-set under stress (tension) for 1-3000 seconds, preferably 5-2500 seconds at a temperature of 160°-350 C., preferably at 180°-340° C., while controlling its deformation within ±20%.

After the heat-setting, the resultant film may be subjected, if necessary, to thermal relaxation at 200°-340° C. for 1-3000 seconds, preferably 5-2000 seconds substantially under no stress. By the heat setting, the thus-stretched film has an increased density and further, improved heat resistance, dimensional stability, mechanical strength and so on.

In order to obtain a stretched film having practical utility, it is necessary that in the uniaxial stretching, the birefringence (difference between the refractive index in the stretched direction and that in a direction perpendicular to the stretched direction) of the uniaxially-stretched film be adjusted to a value at least equal to 0.05 but not higher than 0.4. If the birefringence of the film is lower than 0.05, sufficient strength is not available at high temperatures. A birefringence higher than 0.4 in contrast, the film tends to undergo splitting and moreover, because of whitening, it can not have sufficient strength. When second-stage stretching is performed after the first-stage stretching, birefringences lower than 0.05 after the first-stage stretching tend to cause puckering during subsequent heat-treatment or the biaxially-stretched film tends to undergo splitting in the direction of the first-stage stretching. At the birefringences higher than 0.3, on the other hand, the film tends to undergo whitening or in some instances, splitting in the course of the stretching, so that the stretching becomes no longer feasible. Thus, such an excessively low or high birefringence is not preferred. In order to control the birefringence of the uniaxially-stretched film within the above range, it is only necessary to perform stretching under the conditions specified above.

It has also been found that in addition of good heat stability, the poly(arylene thioether) block copolymer employed in the present invention can be melt extruded at a processing temperature lower by 10°-60° C. than blends of the PATE-PTK system. For a blend of the above system, the blending is generally conducted at a high temperature and under a high shearing stress to blend both the resin components as uniform as possible in the blending step. Such a blending step however tends to cause heat deterioration of the resin components, thereby inevitably resulting in the formation of gel-like substances. Moreover, it is difficult to achieve sufficient blending even at such a high temperature and under such a high shearing stress because of the difference in melt viscosity and chemical properties between the polymers blended. It has been found, however, that the poly(arylene thioether) block copolymer employed in this invention does not require such high temperature and high shearing stress. This allows to avoid high-temperature melt extrusion which tends to cause deterioration of the resins. It has therefore been found that coupled with the good melt stability of the block copolymer, films having good melt stability and almost free of the formation of gel-like substances can be obtained. Moreover, the films exhibit heat resistance at least comparable with that of the films obtained from blends of the PATE-PTK system and have excellent transparency and mechanical properties.

A high-lubricity film whose coefficient of surface dynamic friction as measured against a film of the same type at 25° C. in accordance with ASTM-D1894 is 0.7 or smaller can be obtained, for example, by adding a small amount of calcium carbonate, kaolin, clay, alumina, silica, titanium oxide or the like as a solid powder to the poly(arylene thioether) block copolymer or a composition of the poly(arylene thioether) block copolymer and at least one other thermoplastic resin and then forming the resultant mixture into a film; by treating the surface of an unstretched film with an organic solvent having high compatibility with block copolymer and then stretching the thus-treated film; or by roughening the surface of a stretched film by sand-blasting or with surface-roughening rolls or the like.

Physical properties of stretched films

The stretched films of this invention generally have an average thickness of 0.1–3000 μm, preferably 1–2000 μm and exhibit the following physical properties:

They have a tensile strength at break (23° C.) of 5 kg/mm$^2$ or higher and a tensile elongation at break (23° C.) of 10 % or more as measured in accordance with ASTM-D638.

In addition, the stretched films of this invention are good in dimensional stability at high temperatures, dielectric strength, and the like.

(Application fields)

The stretched films of the present invention can be used for a wide range of applications such as base films for magnetic recording media (including films for vacuum deposition or sputtering and films for magnetic recording films of the perpendicular magnetization type), films for capacitors (including films for chip-type capacitors), printed circuit boards (including both flexible and rigid types), insulating films, printer tapes, stampable sheets, various trays, containers, separation membranes, filtering membranes and ion-exchange resin membranes.

ADVANTAGES OF THE INVENTION

According to this invention, stretched films having excellent transparency, strength, heat resistance, electrical properties, etc. are provided.

The stretched films of this invention use, as a raw material, a high-crystalline block copolymer, which has high melt stability enough for permitting application of conventional melt processing techniques, has a sufficient molecular weight and can be produced at an economical cost, either alone or as a thermoplastic material added with one or more components with a view toward modifying or otherwise changing the block copolymer. Therefore they have practical mechanical properties and also excellent other physical properties with the development of less gel-like substances.

EMBODIMENTS OF THE INVENTION

The present invention will hereinafter be described in further detail by the following examples, experiments and comparative examples. It should however be borne in mind that the present invention is not limited only to the following examples and experiments so long as they do not depart from the spirit or scope of the invention.

[Synthesis Experiment 1]

(Synthesis of block copolymer by Production Process No. 1)

(Synthesis of PATE prepolymer)

A titanium-lined reactor was charged with 225.5 kg of hydrated sodium sulfide (water content: 53.9 wt. %) and 500 kg of N-methylpyrrolidone (hereinafter abbreviated as "NMP"). While gradually heating the contents to 187° C. in a nitrogen gas atmosphere, 104 kg of an NMP solution, which contained 86.3 kg of water, and 34.9 moles of hydrogen sulfide were distilled out. Thereafter, 171.8 kg of p-dichlorobenzene (hereinafter abbreviated as "PDCB") and 167 kg of NMP were then fed, followed by polymerization at 220° C. for 10 hours (PDCB/sodium sulfide=0.9 mol/mol; water content/NMP=3 mol/kg).

After cooling to 50° C., a portion of the slurry of the reaction liquid containing the prepolymer was sampled out and the concentration of active terminal groups was measured by the method which will be set out subsequently.

The concentration of terminal thiolate groups and terminal thiol groups was $462 \times 10^{-6}$ equivalent per gram of the prepolymer PI, while the concentration of terminal chlorine groups was $34 \times 10^{-6}$ equivalent per gram of the prepolymer. The number average molecular weight of the prepolymer as determined from the numbers of those terminal groups was 4032 (average polymerization degree: 37).

Analytical methods:

<Analysis of terminal thiol groups or thiolate groups>

After completion of the polymerization of the prepolymer, a portion of the slurry as the reaction liquid was sampled out and then poured into water to have the polymer precipitated. The prepolymer was collected by filtration, washed in distilled water and then treated with dilute hydrochloric acid, whereby terminal thiolate groups were converted into thiol groups. The resulting polymer was washed for 30 minutes in pure water and for additional 30 minutes in acetone and then dried at room temperature under reduced pressure in a vacuum drier, thereby obtaining a polymer sample. Right after that, about 10 mg to 1 g of the polymer sample was weighed and placed in a stopper-equipped test tube, followed by the addition of 2.5 ml of an acetone solution consisting of 2.5 ml of acetone and 50 mmol of iodoacetamide. The test tube was hermetically closed and then heated at 100° C. for 60 minutes. The test tube was thereafter cooled with water and opened. The liquid-phase portion was separated. The absorbance at 450 nm (i.e., the absorbance of iodine) was measured by means of a spectrophotometer.

Using a calibration curve prepared in advance with respect to the thiol compound

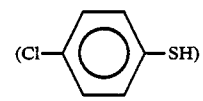

as a standard, the concentration of terminal thiol groups was calculated from the absorbance. (The amount of each sample should be chosen suitably so that the concentration of thiol groups in a corresponding acetone slurry falls within a range of 0.1–0.3 mmol.) Analysis was conducted three times on the same dried sample to determine the average value of the concentration of terminal thiol groups.

<Analysis of terminal halogen groups>

Quantitative analysis of terminal halogen atoms was conducted using an X-ray fluorescence analyzer (model: "3080E2"; manufactured by Rigaku Denki Kabushiki Kaisha).

<Determination of number average molecular weight>

Each number average molecular weight was determined from the data of terminal thiol groups, including thiolate groups, and halogen groups in accordance with the following equation:

$$\text{Number average molecular weight} = \frac{\text{Sample weight (g)}}{\frac{1}{2}\left(\begin{array}{c}\text{Number of terminal} \\ \text{thiol groups}\end{array} + \begin{array}{c}\text{Number of terminal} \\ \text{halogen groups}\end{array}\right)}$$

(Synthesis of block copolymer)

A titanium-lined reactor containing 957.4 kg of the reaction liquid slurry of the PATE prepolymer was charged with 29.8 kg of hydrated sodium sulfide (water content: 54.0 wt. %), 80.5 kg of 4,4'-dichlorobenzophenone (hereinafter abbreviated as "DCBP"), 328 kg of NMP and 127.8 kg of water. After the reactor being purged with nitrogen gas, the contents were heated to 260° C. at which they were polymerized for 2 hours.

The reaction conditions upon synthesis of the block copolymer were as follows:

(1) The molar ratio of the total amount of the charged dihalogenated aromatic compounds [the sum of the amount of PDCB charged upon synthesis of the prepolymer and the amount of DCBP charged upon synthesis of the block copolymer] to the total amount of the charged alkali metal sulfide [the sum of the amount of effective sodium sulfide charged upon synthesis of the prepolymer and the amount of sodium sulfide charged upon synthesis of the block copolymer] was 1.01.

(2) The ratio of the amount of DCBP to the amount of PDCB, charged upon synthesis of the prepolymer, was 32:68 by weight.

(3) The ratio of the water content to the organic amide (NMP) was about 10 mol/kg.

(Collection of block copolymer)

The resultant reaction mixture in the form of a slurry was diluted with a substantially equal amount of NMP and the granular polymer thus obtained was collected by a screen having an opening size of 150 μm (100 mesh). The polymer was washed three times with methanol and further three times with water, and then dried at 100° C. for 24 hours under reduced pressure to obtain a block copolymer (Block Copolymer B₁). The collection rate of the Block Copolymer B₁ was 75%.

(Inherent properties of Block Copolymer)

Block Copolymer B₁ was in the form of pearl-like granules having an average size of 680 μm and had a bulk density of 0.58 g/dl.

By an infrared (IR) spectrum analysis, a strong absorption peak attributed to ketone groups was observed at 1640 cm⁻¹. Wide angle X-ray diffraction which was conducted using "RAD-B System"; manufactured by Rigaku Denki Kabushiki Kaisha) showed a diffraction pattern corresponding to the block copolymer, said pattern being apparently different from that of the corresponding PATE homopolymer or PTK homopolymer or from that of a blend thereof.

The content of sulfur in Block Copolymer B₁ was determined by the combustion flask method and ion chromatography (IC method). Namely, Block Copolymer B₁ was caused to burn in a flask and the resulting combustion gas was absorbed in aqueous hydrogen peroxide solution, whereby the sulfur content of the block copolymer was converted into sulfate groups. The sulfur content was then quantitatively analyzed using an ion chromatographic apparatus equipped with an electrical conductivity detector ("IC-500"; manufactured by Yokogawa Electric Corporation).

The weight fraction $W_b$ (wt. %) of the PATE recurring units

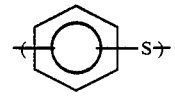

in the block copolymer can be calculated in accordance with the following equation:

$$W_b = 100 \times \frac{\begin{array}{c}\text{Weight fraction of} \\ \text{sulfur in block} \\ \text{copolymer, } (W)\end{array} - \begin{array}{c}\text{Weight fraction of} \\ \text{sulfur in } PTK \\ \text{recurring unit, } (W_1)\end{array}}{\begin{array}{c}\text{Weight fraction of} \\ \text{sulfur in } PATE \\ \text{recurring unit, } (W_2)\end{array} - \begin{array}{c}\text{Weight fraction of} \\ \text{sulfur in } PTK \\ \text{recurring unit, } (W_1)\end{array}}$$

By introducing a measured value W=24.3% and calculated values W1=15.01% and W₂=29.63% into the above equation, $W_b$ was determined to be 63.5%.

(Physical properties of block copolymer)

Physical properties of the block copolymer are as follows:
Melt viscosity: 180 poises
Transition temperature:
  Tg: 100° C.
  Tm: 302° C. and 323° C.
Melt crystallization temperature:
  Tmc (400° C.): 263° C.
  Tmc (400 C./10 min): 230° C.
Melt crystallization enthalpy:
  ΔHmc (400° C.): 53 J/g
Residual melt crystallization enthalpy:
  ΔHmc (400° C./10 min): 42 J/g Incidentally, Tg (glass transition temperature) and Tm (melting point) were measured at a heating rate of 10° C./min from room temperature by a DSC using a pressed sheet (pressed at 380° C.) and powdery polymer as samples, respectively.

[Synthesis Experiment 2]

(Synthesis of block copolymer by Production Process No. 2)

(Synthesis of PATE prepolymer)

A titanium-lined reactor was charged with 3.2 kg of hydrated sodium sulfide (water content: 53.7 wt. %) and 6.0 kg of NMP. While gradually heating the contents to 200° C. under a nitrogen gas atmosphere, 2.541 kg of an NMP solution containing 1.326 kg of water and 0.38 mole of hydrogen sulfide were distilled out. Then, 0.123 kg of water was added, followed by the feeding of a mixed solution of 2.35 kg of PDCB and 4.51 kg of NMP. Polymerization was conducted at 220° C. for 10 hours (PDCB/sodium sulfide =0.86 mol/mol, water content/NMP=about 3 mol/kg), thereby obtaining a reaction slurry containing a PATE prepolymer. The number average molecular weight of the prepolymer was 1530 (average polymerization degree: 14).

(Synthesis of PTK prepolymer)

A titanium-lined 20-l reactor was charged with 3.640 moles of DCBP, 2.039 moles of hydrated sodium sulfide (water content: 53.7 wt. %), 176 g of water and 4.004 kg of NMP. After the reactor being purged with nitrogen gas, the contents were maintained at 220° C. for 1 hour (water content/NMP=about 5 mol/kg) to obtain a reaction slurry containing a PTK prepolymer.

(Synthesis of block copolymer)

A charge pot equipped with a heater was mounted on the titanium-lined 20-l reactor which had been charged with the reaction slurry containing the PTK prepolymer. The pot was charged with 9.12 kg of the reaction slurry containing the PATE prepolymer. After the reaction slurry being heated to 220° C., the reactor was charged with the reaction slurry containing the PATE prepolymer and then with 1.146 kg of water. The contents were thereafter mixed.

The contents were maintained at 260° C. for 2 hours. After the contents being allowed to cool down to 240° C., a final stabilizing treatment of the reaction was effected by adding 0.4356 mole of DCBP and 0.5 kg of NMP and then reacting the contents at 240° C. for 0.2 hour. The reaction conditions upon synthesis of the block copolymer were as follows:

(1) The molar ratio of the total amount of the charged dihalogenated aromatic compounds [the sum of the amount of PDCB charged upon synthesis of the PATE prepolymer and the amount of DCBP charged upon synthesis of PTK prepolymer] to the total amount of the charged alkali metal sulfide [the sum of the amount of sodium sulfide charged upon synthesis of the PATE prepolymer and the amount of sodium sulfide charged upon synthesis of the PTK prepolymer] was 0.99.

(2) The ratio of PATE blocks to PTK blocks was approximately 60:40 (by weight).

(3) The ratio of the water content to the amount of the charged organic amide (NMP) was about 10 mol/kg.

(Collection of block copolymer)

Collection was conducted in a similar manner to Synthesis Experiment 1, thereby obtaining a block copolymer (Block Copolymer $B_2$). The collection rate was 78%.

(Physical properties of block copolymer)

Physical properties of Block Copolymer $B_2$ were as follows:
Melt viscosity: 650 poises.
Transition temperature:
  Tg: 104° C.
  Tm: 301° C. and 324° C.
Melt crystallization temperature:
  Tmc (400° C.): 252 C.
  Tmc (400 C/10 min): 221° C.
Melt crystallization enthalpy:
  $\Delta$Hmc (400° C.): 43 J/g.
Residual melt crystallization enthalpy:
  $\Delta$Hmc (400° C./10 min): 36 J/g.

Incidentally, the ratio (by weight) of the sum of PATE recurring units to the sum of PTK recurring units was 1.6 (62/38).

[Synthesis Experiment 3]

(Synthesis of melt-stable PTK)

A titanium-lined reactor was charged with 90 moles of DCBP, 90 moles of hydrated sodium sulfide (water content: 53.6 wt. %) and 90 kg of NMP (water content/NMP=5 mol/kg). After the reactor being purged with nitrogen gas, the contents were heated from room temperature to 240° C. over 1.5 hours and were then maintained at 240° C. for 2 hours to react them. Thereafter, to effect a stabilization treatment in a final stage of the reaction, 4.5 moles of DCBP, 18 kg of NMP and 90 moles of water were added, followed by a reaction at 240° C. for further 1 hour.

The rector was cooled and the reaction mixture in the form of a slurry was taken out of the reactor. The slurry was poured into about 200 l of acetone to have the resultant polymer precipitated. The thus-precipitated polymer was collected by filtration and washed twice with acetone and additionally twice with water. Acetone and water were removed to obtain the was dried at 100° C. for 12 hours under reduced pressure to obtain Polymer PTK-1 as a fine powder having an average particle size of 11.5 $\mu$m.

The melting point of Polymer PTK-1 (powder) was 360° C.

As an index of the molecular weight of PTK, the solution viscosity of PTK-1 was measured.

Namely, the reduced viscosity $\eta_{red}$ of PTK-1 as measured at 25 C by a Ubbelohde's viscometer after dissolving the PTK-1 at a concentration of 0.5 g/dl in 98% sulfuric acid was 0.63 dl/g.

As an index of the crystallinity of PTK, its density was measured.

Namely, the PTK powder was first of all placed between two sheets of polyimide film ("Kapton"; product of E. I. du Pont de Nemours & Co., Inc.). It was preheated at 385° C. for 2 minutes and then press-formed at 385° C. for 0.5 minute by a hot press. It was then quenched to obtain an amorphous sample whose thickness was about 0.15 mm.

In addition, the amorphous sample thus-obtained was annealed at 280° C. for 30 minutes to prepare an annealed sample with an increased degree of crystallinity The densities of the amorphous sample and annealed sample (crystallized sample) measured at 25° C. by the density gradient tube method of the zinc chloride/water system were 1.30 g/cm$^3$ and 1.35 g/cm$^3$, respectively.

With respect to the PTK-1 powder obtained in Synthesis Experiment, the residual melt crystallization enthalpy, $\Delta$Hmc (420° C./10 min) was measured as an index of its melt stability. Namely, the temperature corresponding to a peak of melt crystallization measured by the DSC is represented by Tmc (420° C./10 min), while a residual melt crystallization enthalpy, $\Delta$Hmc (420° C./10 min) was determined by converting the area of the peak.

Described specifically, about 10 mg of PTK-1 (powder) were weighed. After holding the PTK-1 at 50° C. for 5 minutes in an inert gas atmosphere, it was heated up at a rate of 75° C./min to 420° C. and held at that temperature for 10 minutes. While cooling the PTK-1 at a rate of 10° C./min thereafter, its Tmc (420° C./10 min) and $\Delta$Hmc (420° C./10 min) were measured. As a result, $\Delta$Hmc (420° C./10 min) and Tmc (420° C./10 min) were 43 J/g and 290° C., respectively.

In addition, ΔHmc (400° C./10 min) and Tmc (400° C./10 min) were 55 J/g and 313° C., respectively.

[EXAMPLE 1]

(Uniaxially-stretched films)

To Block Copolymer $B_1$ obtained in Synthesis Experiment 1, $Ca(OH)_2$ was added as a stabilizer in the prescribed amounts shown in Table 1. The resultant compositions were separately blended in a tumbler blender, charged into a twin-screw extruder equipped with screws rotatable in the same direction and a nozzle of 5 mm across and having a cylinder diameter of 35 mm, molten and kneaded at a cylinder temperature of 350° C., extruded into strands, quenched and then chopped. Pellet samples of the respective compositions were thus obtained.

The pellet samples were separately fed to a single screw extruder having a cylinder diameter of 35 mm and fitted with a small T-die, molten and kneaded at a cylinder temperature of 330° C., quenched by cooling rolls, thereby obtaining corresponding amorphous films having an average thickness of 150 μm.

With regard to each of those amorphous films, the ratio of a peak area upon crystallization to a peak area upon melting of crystals (ΔSTc/ΔSTm) was measured by a DSC at a heating rate of 10° C./min. As a result, the peak area ratio of the stabilizer-added amorphous film and that of the film made of the block copolymer alone, i.e., the stabilizer-free film were both 0.4. Judging from this value, the films thus obtained were found to be substantially amorphous.

A portion of each of the amorphous films thus obtained was stretched 4.5 times at 112° C. in one direction by using a biaxial stretching tester manufactured by Toyo Seiki Seisakusho Ltd. The birefringence of the film made of the stabilizer-added composition was 0.22, while that of the film made of the block copolymer alone was also 0.22. Then, the films were heat-set at 280° C. for 10 minutes under a fixed length, thereby obtaining uniaxially stretched films having a thickness of about 33 μm. Physical properties of the uniaxially-stretched films thus obtained and also the melt stability of pellets are as shown in Table 1.

The long-run property of the film made of the composition added with $Ca(OH)_2$ as a stabilizer was better compared with that of the film made of the block copolymer alone and practically no thermally-decomposed products were observed sticking on the inner wall of the extruder.

<Measurement of Physical Properties>

Strength and elongation properties

With respect to each of the sample films having a width of 10 mm and a length of 20 mm, the strength and elongation properties were measured in accordance with ASTM-D638 by "TENSILON" (RTM-100 Model; manufactured by Toyo Baldwin Company) at a temperature of 23° C. and a deformation rate of 10 mm/min (50%/min).

Tensile modulus

The tensile modulus of each sample was measured at a temperature of 23° C. in accordance with ASTM-D638.

Birefringence

The birefringence of each uniaxially-stretched film was determined by measuring the retardation (the retardation between the advance of light rays in the direction of the orientation in the film and that in a direction perpendicular thereto) and using the following formula:

retardation=(film thickness)×(birefringence)

When the retardation of sample film is too large to conduct the measurement with ease, a film whose retardation had already been known was overlapped on the sample film with their axes of orientation extending precisely at a right angle, whereby the retardation of the sample film was measured in a state that the retardation is reduced. After that, the retardation value of the sample film was obtained by adding the retardation value of the known film to the thus-measured retardation value of the sample film. Division of thus-obtained retardation value with the film thickness leads to its birefringence.

Measuring method of gel-like substances

Each film was cut into a piece of 20 cm×20 cm and placed between two polarizing plates arranged with their crystallographic axes extending at a right angle. While upwardly directing fluorescent light on the films, the film was looked down to count spots visible to the eye. The number of the spots was recorded as the amount of gel-like substance.

Melt stability of pellets

Melt stability was evaluated based on $\eta_{30}^*/\eta_5^*$ and $\eta_{60}^*/\eta_5^*$ obtained in the following manner. About 20 g of each pellet sample were placed in a barrel of Capirograph, which barrel had been heated at 350° C. The melt viscosity was measured 5 minutes, 30 minutes, 60 minutes later, thereby determining $\eta_5^*$, $\eta_{30}^*$ and $\eta_{60}^*$ (all, at a shear rate of 1200 sec$^{-1}$), respectively. The closer to 1 the ratio, the better the melt stability.

TABLE 1

|  | Example 1 | |
|---|---|---|
|  | 1-1 | 1-2 |
| Experiment No. | (Pellets-1) | (Pellets-2) |
| Composition of pellets | Block Copolymer $B_1$(100) | Block Copolymer $B_1$(100) |
| (parts by weight) | $Ca(OH)_2$ (0) | $Ca(OH)_2$ (0.5) |
| Physical properties of uniaxially-stretched films | | |
| Density[1] (25° C.)[g/cm$^3$] | 1.36 | 1.36 |
| Strength/elongation properties (23° C.) (machine direction)[2] | | |
| Tensile strength at break (kg/mm$^2$) | 15 | 15 |
| Tensile elongation at break (%) | 31 | 33 |
| Tensile modulus (kg/mm$^2$) | 420 | 425 |
| Number of gel-like spots | 7 | 3 |
| Melt-stability of pellets | | |
| $\eta_{30}^*\eta_5^*$ | 1.2 | 0.9 |

TABLE 1-continued

| | Example 1 | |
|---|---|---|
| Experiment No. | 1-1 | 1-2 |
| | (Pellets-1) | (Pellets-2) |
| Composition of pellets | Block Copolymer $B_1(100)$ | Block Copolymer $B_1(100)$ |
| (parts by weight) | $Ca(OH)_2$ (0) | $Ca(OH)_2$ (0.5) |
| $\eta_{60}*\eta_5*$ | 3.4 | 0.9 |
| Remarks | No stabilizer | $Ca(OH)_2$ added as stabilizer |

[1] Determined by the density gradient tube method in lithium bromide/water system.
[2] Machine direction: stretching direction.

[EXAMPLE 2]

(Sequentially- and biaxially-stretched films)

A portion of each amorphous film obtained in Example I was stretched at 112.C and a draw ratio of 3 times in the machine direction by the biaxial stretching tester used in Example 1. The birefringence of the stabilizer-added film was 0.18, while that of the film formed of the block copolymer alone was 0.19. Then, each film was stretched at 112° C. at a draw ratio of 3 times in the transverse direction, heat-set at 280° C. for 10 minutes under a fixed length, and then subjected to thermal-relaxation at 270° C. for 5 minutes without stress. For this manner, a biaxially-stretched films having a thickness of 14–18 μm were obtained respectively. Physical properties of the biaxially-stretched films thus obtained are summarized in Table 2.

[EXAMPLE 3]

(Simultaneously- and biaxially-stretched film)

Each amorphous film obtained in Example 1 was biaxially-stretched simultaneously at 112° C. and draw ratios of 3.2 times in the machine direction and of 3.2 times in the transverse direction by the biaxial stretching tester in Example 1. The film thus obtained was heat-set at 280° C. for 10 minutes under a fixed length. In this manner, biaxially-stretched films having a thickness of 10–15 μms were obtained respectively.

Physical properties of the biaxially-stretched films thus obtained are given in Table 3.

TABLE 3

| | Example 2 | |
|---|---|---|
| | 3-1 | 3-2 |
| Experiment No. | (Pellets-1) | (Pellets-2) |
| Composition of pellets | Block Copolymer $B_1(100)$ | Block Copolymer $B_1(100)$ |
| (parts by weight) | $Ca(OH)_2$ (0) | $Ca(OH)_2$ (0.5) |
| Physical properties of biaxially-stretched films | | |
| Density[1] (25° C.)[g/cm$^3$] | 1.36 | 1.36 |
| Strength/elongation properties (23° C.) | | |
| Tensile strength at break (kg/mm$^2$) | 14 | 15 |
| Tensile elongation at break (%) | 21 | 24 |
| Tensile modulus (kg/mm$^2$) | 340 | 344 |
| Number of gel-like spots | 5 | 4 |
| Remarks | No stabilizer | $Ca(OH)_2$ added as stabilizer |

[1] Determined by the density gradient tube method in lithium bromide/water system.

[EXAMPLE 4]

Comparative Examples 1-2

In order to demonstrate the improved processability (lowered processing temperature of the block copolymer of the present invention), amorphous films were prepared at varied melt-extrusion temperatures and the

TABLE 2

| | Example 2 | |
|---|---|---|
| | 2-1 | 2-2 |
| Experiment No. | (Pellets-1) | (Pellets-2) |
| Composition of pellets | Block Copolymer $B_1(100)$ | Block Copolymer $B_1(100)$ |
| (parts by weight) | $Ca(OH)_2$ (0) | $Ca(OH)_2$ (0.5) |
| Physical properties of biaxially-stretched films | | |
| Density[1] (25° C.) [g/cm$^3$] | 1.36 | 1.36 |
| Strength/elongation properties (MD/TD)[2] (23° C.) | | |
| Tensile strength at break (kg/mm$^2$) | 12/12 | 12/13 |
| Tensile elongation at break (%) | 23/25 | 26/28 |
| Tensile modulus (kg/mm$^2$) | 337/340 | 343/340 |
| Number of gel-like spots | 4 | 2 |
| Remarks | No stabilizer | $Ca(OH)_2$ added as stabilizer |

[1] Determined by the density gradient tube method in lithium bromide/water system.
[2] "MD" (machine direction) means the stretching direction in the first-stage stretching and "TD" (transverse direction) designates the stretching direction in the second-stage stretching.

degree of occurrence of gel-like substances in each biaxially-stretched film was measured.

Namely, a composition of Block Copolymer $B_2$ obtained in Synthesis Experiment 2 and $Ca(OH)_2$ (Example 4); a composition of PTK-1, that is, poly(arylene thioether-ketone) obtained in Synthesis Experiment 3 and $Ca(OH)_2$ (Comparative Example 1); and a composition of a 40:60 by weight mixture of PTK-1 and PATE [poly(p-phenylene thioether); "FORTRON W-300"; product of Kureha Chemical Industry Co., Ltd.] and $Ca(OH)_2$ (Comparative Example 2) were separately charged into a single screw extruder having a cylinder diameter of 35 mm and equipped with a small T-die, and then extruded at melt extrusion temperatures of 340° C. and 370° C. to prepare amorphous films having an average thickness of about 150 μm.

Each of the amorphous films thus obtained was subjected to simultaneous biaxial stretching at 112° C. and draw ratios of 3.2 times in the machine direction and 3.2 times in the transverse direction. Then, it was heat-set at 280° C. for 10 minutes under a fixed length. In this manner, films having an average an average thickness of about 15 μm were obtained. The numbers of gel-like spots formed and physical properties of the films (thermal shrinkage factors, strength and elongation properties) were measured. The results are given in Table 4.

In addition, the dielectric strength of each film thus obtained was measured. As a result, the dielectric strength of the stretched film of Example 4 was 350 V/μm (when melt-extruded at 340° C.) and 340 V/m (when melt-extruded at 370° C.), respectively. It was however impossible to measure the dielectric strength of the stretched film melt-extruded at 340° C. in Comparative Example 1. The other stretched film of Comparative Example 1, which was melt-extruded at 370° C., was 290 V/μm. Further, the dielectric strength of the stretched film of Comparative Example 2 was 270 V/μm (when melt-extruded at 340° C.) and 320 V/μm (when melt-extruded at 370° C.), respectively.

<Measurement of physical properties>

Thermal shrinkage factor

Each amorphous film was cut into a square piece of 10 cm × 10 cm. Two lines were drawn on the film, passing through the center of the film in parallel with the respective paired sides, whereby a cross mark was placed. After the lengths of the two lines of the cross mark were precisely measured by a cathetometer, the film was pinched by a clip at one of four corners and then suspended for 10 minutes in a Geer oven to cause thermal shrinkage. Thereafter, the film was taken out of the oven and allowed to cool down to room temperature. The lengths of the two lines of the cross mark were measured again and then compared with the corresponding lengths before heating. The difference was expressed in terms of percentage and recorded as a thermal shrinkage factor.

Dielectric strength

With respect to each of the stretched films, the dielectric constant (V/μm) was measured at room temperature in air under a d.c. voltage applied across electrodes having a diameter of 25 mm in accordance with JIS C 231s. As a datum of the dielectric strength, the average of 40 pieces of data was used. The dielectric strength is an index of electric insulating property of the film and if electric defects, e.g., electro-conductive particles and voids are contained in the film, electric charges are concentrated on these so that the film is susceptible to dielectric breakdown and its dielectric strength is reduced.

Transparency

Each sample film of about 15 mm × 30 mm was placed in a holder and its light transmittance was measured within a wavelength range of from 300 to 900 nm by a "UV-VISIBLE RECORDING SPECTROPHOTOMETER UV-260" manufactured by Shimadzu Corp. The transmittance at the wavelength of 600 nm was recorded as transparency out of all the transmittance measured.

TABLE 4

| Experiment No. | Example 4 | | Comp. Ex. 1 | | Comp. Ex. 2 | |
|---|---|---|---|---|---|---|
| Melt extrusion temperature (°C.) | 340 | 370 | 340 | 370 | 340 | 370 |
| Composition of pellets (parts by weight) | Block Copolymer $B_2$ 100 $Ca(OH)_2$ 0.3 | Block Copolymer $B_2$ 100 $Ca(OH)_2$ 0.3 | PTK-1 100 $Ca(OH)_2$ 0.3 | PTK-1 100 $Ca(OH)_2$ 0.3 | PTK-1 40 PATE[1] 60 $Ca(OH)_2$ 0.3 | PTK-1 40 PATE[1] 60 $Ca(OH)_2$ 0.3 |
| Properties of biaxially-stretched films Strength/elongation properties (23° C.) | | | 2 | | 3 | |
| Tensile strength at break (kg/mm$^2$) | 13 | 12 | — | 12 | 11 | 12 |
| Tensile elongation at break (%) | 23 | 21 | — | 17 | 16 | 20 |
| Thermal shrinkage factor (%) (250° C.) | 0.8 | 0.8 | — | 0.5 | 3.0 | 2.0 |
| Number of gel-like spots | 3 | 15 | — | 18 | 50 | 35 |
| Transparency | | | | | | |
| Light transmittance (%) | 78 | 74 | — | 60 | 5 | 6 |

[1]Poly(p-phenylene thioether) ("FORTRON-W-300"; product of Kureha Chemical Industry Co., Ltd.)
[2]No biaxial strethcing was feasible due to the unduly low extrusion temperature and excessively large melt fracture of sheet upon extrusion.
[3]Poor biaxial stretching was only feasible due to the unduly low extrusion temperature and excessively large melt fracture of the sheet upon extrusion.

It has been found from Table 4 that Example 4 of this invention features the observation of substantially no formation of gel-like substances. From a comparison with Comparative Examples 2 in which the pellets had substantially the same composition as Block Copolymer $B_2$, Example 4 has also been found to feature the possibility of use of a lower processing temperature.

As is apparent from the thermal shrinkage factors at 250° C. in Table 4, the block copolymer has been found to have good thermal dimensional stability. Although full elucidation has not been made yet, this feature has probably been brought about because the block copolymer of this invention constitutes a more uniform system and contains smaller localized strains compared with the blend system of homopolymers of the individual components of the blocks. In addition, compared with Comparative Example, the film of Example 4 had better dielectric strength. This indicated that the film of Example 4 contained fewer gel-like spots and moreover less electrically-defective substances formed by thermal decomposition of the like. Therefore, the film of Example 4 had excellent electrical properties.

Furthermore, as is apparent from the light transmittance, the film of Example 4 had good transparency while the blend system of Comparative Example 2 was only able to give opaque films of low light transmittance. Such a tendency was also observed on the sheets before stretching. Even when the stretching was conducted at varied temperatures, the blend system failed to provide any transparent film unlike Example 4. Accordingly the films of the blend system are considered non-uniform when judged on the order of optical wavelengths.

EXAMPLE 5]

Mixed uniformly with 100 parts by weight of Block Copolymer $B_1$ in a Henschel mixer were 0.5 part by weight of titanium oxide powder and 0.5 part by weight of silica powder to obtain a blend.

Under a nitrogen gas stream, the blend was charged into a single-screw extruder having a cylinder diameter of 35 mm, extruded at a melt temperature of 340° C. into strands, quenched and chopped to prepare a pellet sample. The pellet sample thus obtained was retained for 3 hours in an oven of 150° C., whereby crystallization was conducted.

A biaxially-stretched film was prepared from the pellet sample in a manner similar to Example 2. The birefringence of the uniaxially stretched film before biaxial stretching was 0.18. The coefficient of surface dynamic friction of the resultant biaxially stretched film as measured against a film of the same type at 25° C. in accordance with ASTM-D1894 was 0.43, thereby indicating that the film had high lubricity.

[EXAMPLE 6]

80 parts by weight of Block Copolymer $B_1$, 20 parts by weight of PTK-1 obtained in Synthesis Experiment, and as stabilizers, 1.0 part by weight of $Ca(OH)_2$, a basic compound, and 0.5 part by weight of PEP36 ["MARK PEP 36"; bis-(2,6-di-t-butyl-4-methylphenyl)-pentaerythritol diphosphite; product of Adeka Argus Chemical Co., Ltd.], a phosphorus compound as an antioxidant were mixed at room temperature in a Henschel mixer. Then, the pellet sample was prepared in a similar manner to Example 1 except that the cylinder temperature Was changed to 360° C.

The $\eta_{30}^*/\eta_5^*$ and $\eta_{60}^*/\eta_5^*$ of pellet sample were 1.02 and 1.04, respectively, so that the pellet sample had good melt stability.

The pellet sample was retained in an oven of 150° C. for 2 hours for crystallization. Then, it was extruded into a molten film in a similar manner as in Example 1 except that the cylinder temperature was changed to 360° C.. The film was quenched, thereby obtaining an amorphous film ($\Delta STc/\Delta STm=0.35$).

The film obtained was biaxially stretched simultaneously at 118° C. and at a draw ratio of 3 times in the machine direction and at a draw ratio of 3 times in the transverse direction in a manner similar to Example 3.

The film thus obtained had a thickness of 11 μm. The biaxially stretched film was held on a metal frame, fixed at all the peripheries, and heat-set at 300° C. for 10 minutes under a fixed length. The tensile strength at 23° C., elongation at 23° C. and tensile modulus at 23° C. of the film were 17 kg/mm², 23% and 340 kg/mm², respectively. In addition, its thermal shrinkage factor was 0.5%.

[EXAMPLE 7]

60 parts by weight of Block Copolymer $B_2$ and 40 parts by weight of PATE used in Comparative Example 2 were blended at room temperature in a Henschel mixer. Then, a pellet sample was prepared in a similar manner to Example 1 except that the cylinder temperature was changed to 330° C.

The pellet sample was retained in an oven of 150° C. for 4 hours for crystallization. Thereafter, the molten film was extruded in a manner similar to Example 1 except that the cylinder temperature was changed to 330° C. and quenched, thereby obtaining an amorphous film ($\Delta STc/\Delta STm=0.30$).

Using the above-prepared film, a stretched film having a thickness of 15 μm was prepared. Film-forming conditions at that time were as follows:

| Stretching along first axis: | |
| --- | --- |
| Stretching temperature: | 110° C. |
| Draw ratio: | 3 times |
| Birefringence: | 0.18 |
| Stretching along second axis: | |
| Stretching temperature: | 110° C. |
| Draw ratio: | 3 times |
| Heat-setting: | |
| Temperature: | 280° C. |
| Period: | 300 seconds |
| Percent relaxation | 5% |

The MD/TD-tensile strength of this film at 23° C. and the MD/TD-elongation at 23° C. and MD/TD-tensile modulus at 23° C. were 16/17 kg/mm², 26/24 % and 335/340 kg/mm², respectively. In addition, the thermal shrinkage factor of the film was 1.5% and the number of gel-like spots was 2.

The terms "MD" and "TD" as used herein with respect to "MD/TD" mean the stretching direction along a first axis, i.e., the machine direction and the stretching direction along a second axis, i.e., the transverse direction.

What is claimed is:

1. A stretched poly(arylene thioether) block copolymer film, comprising thermoplastic material composed of:
   (A) 100 parts by weight of a poly(arylene thioether) block copolymer (Component A) alternately comprising (X) at least one poly(arylene thioether-ketone) block having predominant recurring units of the formula

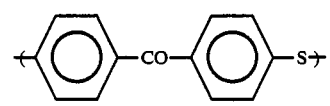

wherein the —CO— and —S— are in the para position to each other and (Y) at least one poly(arylene thioether) block having predominant recurring units of the formula

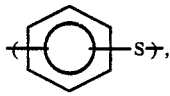

(a) the ratio of the total amount of the poly(arylene thioether) block (Y) to the total amount of the poly(arylene thioether-ketone) block (X) ranging from 0.05 to 5 by weight, (b) the average polymerization degree of the one poly(arylene thioether) block (Y) being at least 10, and (c) said block copolymer having a melt viscosity of 50–100,000 poises as measured at 350° C. and a shear rate of 1,200/sec;

(B) optionally, not greater than 100 parts by weight of at least one other thermoplastic resin (Component B); and (C) optionally, not greater than 15 parts by weight of at least one filler (Component C).

2. The stretched film as claimed in claim 1, wherein the poly(arylene thioether) block copolymer (Component A) has a melt crystallization temperature, Tmc (400° C./10 min) of at least 170° C. and a residual melt crystallization enthalpy, ΔHmc (400° C./10 min) of at least 10 J/g, wherein Tmc (400° C./10 min) and ΔHmc (400° C./10 min) are determined by a differential scanning calorimeter at a cooling rate of 10° C./min after the block copolymer is held at 50° C. for 5 minutes in an inert gas atmosphere, heated to 400° C. at a rate of 75° C./min and then held for 10 minutes at 400° C.

3. The stretched film as claimed in claim 1, wherein the poly(arylene thioether) block (Y) in the poly(arylene thioether) block copolymer (Component A) has predominant recurring units of the formula

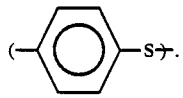

4. The stretched film as claimed in claim 1, further comprising, per 100 parts by weight of the poly(arylene thioether) block copolymer (Component A), 0.1–10 parts by weight of at least one basic compound (Component D) selected from the group consisting of hydroxides, oxides and aromatic carboxylates of group IIA metals of the periodic table other than magnesium, and aromatic carboxylates, carbonates, hydroxides, phosphates, including condensation products, and borates, including condensation products, of group IA metals of the periodic table and 0–10 parts by weight of at least one antioxidant (Component E) selected from the group consisting of hindered phenolic compounds, phosphorus compounds and hindered amine compounds.

5. The stretched film as claimed in claim 1, wherein the thermoplastic resin (Component B) is at least one polymer selected from poly(arylene thioethers) having predominant recurring units of the formula

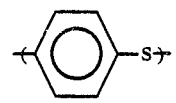

and poly(arylene thioether-ketones) having predominant recurring units of the formula

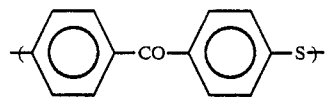

wherein the —CO— and —S— are in the para position to each other.

6. The stretched film as claimed in claim 1, wherein the thermoplastic material is free of the thermoplastic resin (Component B).

7. The stretched film as claimed in claim 1, wherein the thermoplastic material is free of the filler (Component C).

8. The stretched film as claimed in claim 1, wherein the film has been stretched in at least one direction at a draw ratio of 1.5–7 times.

* * * * *

UNITED STATES PATENT AND TRADEMARK OFFICE
CERTIFICATE OF CORRECTION

PATENT NO.   : 4,960,806
DATED        : October 2, 1990
INVENTOR(S)  : Yoshikatsu SATAKE et al.

It is certified that error appears in the above-identified patent and that said Letters Patent is hereby corrected as shown below:

On the title page, under [75] Inventors,

After "Takashi Kaneko," delete "Tokyo" and replace with
--Kanagawa--;

After "Hiroyuki Endo," delete "Chiyoda" and replace with
--Ibaraki--.

Under [30] Foreign Application Priority Data, please add the following:

--Sept. 26, 1989   [JP] Japan...... 1-248085--

Signed and Sealed this

Seventeenth Day of March, 1992

Attest:

HARRY F. MANBECK, JR.

*Attesting Officer*                *Commissioner of Patents and Trademarks*